United States Patent Office 3,776,968
Patented Dec. 4, 1973

3,776,968
CATALYTIC CONVERSION OF POLYCYCLIC AROMATIC HYDROCARBONS IN THE PRESENCE OF HYDROGEN
Ronald D. Bushick, Glen Mills, and Alfred E. Hirschler, Springfield, Pa., assignors to Sun Oil Company, Philadelphia, Pa.
No Drawing. Continuation-in-part of application Ser. No. 749,932, Aug. 5, 1968, now Patent No. 3,565,964, dated Feb. 23, 1971. Divided and this application Feb. 23, 1971, Ser. No. 118,177
Int. Cl. C07c 5/24, 15/28
U.S. Cl. 260—668 F                              14 Claims

ABSTRACT OF THE DISCLOSURE

Polycyclic aromatic hydrocarbons (preferably containing at least three condensed rings) can be converted to other polycyclic hydrocarbons by a catalytic conversion process comprising contacting the hydrocarbon with an acidic alumino-silicate zeolite in the presence of from 5–5000 p.s.i. of hydrogen at an elevated temperature (e.g., at least 40° C., preferably 100–200° C.) for a period of time sufficient to allow the catalytic conversion to occur. For example, s-hydrindacene (s-HIN) can be converted to as-hydrindacene (as-HIN) by so contacting the s-HIN with a GdHY zeolite at 100–200° C. (e.g., 150° C.) in the presence of 15–250 p.s.i.g. of hydrogen at a weight hourly space velocity in the range of 0.1–20 (preferably 0.25–10).

CROSS-REFERENCES TO RELATED APPLICATIONS

This application is a continuation-in-part of Ser. No. 749,932, filed Aug. 5, 1968, which issued Feb. 23, 1971 as U.S. Pat. No. 3,565,964.

Acidic alumino-silicate zeolites which can be utilized in the subject process have been described in copending application Ser. No. 590,225, filed Oct. 28, 1966, now U.S. Pat. No. 3,396,203 and in copending application Ser. No. 750,432, filed Aug. 2, 1968, of Ronald D. Bushick entitled: "Process for Producing Sym-Octahydroanthracene from Sym-Octahydrophenanthrene," and in copending application Ser. No. 581,129, filed Aug. 25, 1966, now abandoned of Francis William Kirsch, David S. Barmby and John D. Potts entitled: "Process for Paraffin-Olefin Alkylation," and in copending application Ser. No. 716,190, filed Mar. 26, 1968 of Francis William Kirsch, David S. Barmby and John D. Potts entitled: "Process for Paraffin-Olefin Alkylation and in copending application Ser. No. 715,998, filed Mar. 26, 1968 of Francis William Kirsch, David S. Barmby and John D. Potts entitled: "Gd Zeolite and Hydrocarbon Conversion Process with Gd Zeolite Catalyst," and in copending application Ser. No. 715,994, filed Mar. 26, 1968, now U.S. Pat. No. 3,541,001 of Alfred E. Hirschler and in copending application Ser. No. 718,980, filed Mar. 26, 1968, now U.S. Pat. No. 3,534,114, of Ronald D. Bushick and in copending application Ser. No. 749,714, filed Aug. 2, 1968 of Francis William Kirsch, David S. Barmby and John D. Potts entitled: "Dy Zeolite and Hydrocarbon Conversion Process with Dy Zeolite Catalyst," and in copending application Ser. No. 749,739, filed Aug. 2, 1968, now U.S. Pat. No. 3,534,115, of Ronald D. Bushick entitled: "Combination of Dy Alumino-Silicate Catalyst and Hydrogenation Catalyst," all of these being assigned to Sun Oil Company. Other useful alumino-silicate catalysts (including acid-leached mordenite) in the present process are found in Ser. No. 28,608, filed Apr. 15, 1970 and Ser. No. 90,463, filed Nov. 17, 1970, both of Alfred E. Hirschler. The utility of naphthenes such as perhydropolycyclic hydrocarbons as traction fluids (or as components of a blended traction-fluid base stock) is taught in Ser. No. 33,023, filed Apr. 29, 1970 of Irl N. Duling and Frederick P. Glazier, entitled: "Combination of Tractive Drive and Traction Fluid Comprising Cyclic or Acyclic Compounds." Another utility of such naphthenes is found in an application filed on or about Feb. 19, 1971, entitled: "Lubrication of Controlled-Slip Differential," of David S. Gates, Paul E. Hagstrom and Marcus W. Haseltine, Jr. The conversion of s-hydrindacene to as-hydrindacene, or the reverse conversion, is taught in Ser. No. 869,-868, filed Oct. 27, 1969 of Ronald D. Bushick. The disclosure of all of the above-cited applications is hereby incorporated in the present application.

BACKGROUND OF THE INVENTION

In the aforementioned copending U.S. patent applications having the Ser. Nos. 590,225, 715,994, 715,998, 718,-980, 749,714 and 749,739, processes are disclosed for the catalytic conversion of polycyclic aromatic hydrocarbons (e.g., s-OHP to s-OHA) comprising contacting a hydrocarbonaceous feed, in a conversion zone at an elevated temperature, with an acidic alumino-silicate catalyst for sufficient time to permit the conversion to occur. The present invention, as that of parent application Ser. No. 749,-932, is an improvement on said processes, comprising (in one aspect) conducting such processes in the presence of from 5–5000 p.s.i. of hydrogen (preferably, 15–1500 p.s.i. of hydrogen).

SUMMARY OF THE INVENTION

A hydrocarbon conversion process comprises contacting a polycyclic aromatic hydrocarbon (e.g., dicyclohexyl) in a conversion zone at an elevated conversion temperature with an acidic alumino-silicate catalyst in the presence of from 5–5000 p.s.i. of hydrogen gas and recovering an upgraded hydrocarbon conversion product (e.g., dimethyl decalins), said acidic aluminosilicate catalyst containing less than one alkali metal cation and at least one cationic monovalent, divalent or trivalent metal (e.g., $Gd^{+3}$), metal oxide (e.g., $Gd=O$ or $+^2Gd—O—Gd^{+2}$), metal hydride (e.g., $+^2GdH$), metal hydroxide (e.g., $+^2Gd—OH$) or mixed metal hydride hydroxide (e.g., $+Gd_H{}^{OH}$) for every twelve atoms of aluminum in said alumino-silicate framework. For example, s-hydrindacene can be converted to as-hydrindacene, or the reverse conversion can be made.

FURTHER DESCRIPTION OF THE INVENTION

The meals (and catalysts) can be those disclosed in the aforementioned United States patent applications; however, in the preferred cations, the metal of the cations consists essentially of one or more metals from the group consisting of Al, Mg, Ca, Sr, Ba, Cr, Mn, Zn, Ag, Cd, In, Sn, Sc, Y, La, Ce, Pr, Nd, Sm, Eu, Gd, Tb, Dy, Ho, Er, Tm, Yh, Lu, Th and U. Halide adjuvants (e.g., Ser. Nos. 581,129 and 716,190 and of previously cited applications entitled: "Dy Zeolite and Hydrocarbon Conversion Process with Dy Zeolite Catalyst" and "Combination of Dy Alumino-Silicate Catalyst and Hydrogenation Catalyst") can also be present in the reaction zone.

Although a hydrogenation catalyst (e.g., see Patent No. 3,396,203 and Patent No. 3,534,114) can also be present in the conversion zone (as for converting s-OHP to s-OHA), we prefer that the catalyst (and reaction zone) not contain such metals (or cations of such metals) as Co, Ni, Cu, Nb, Mo, Ru, Th, Pd, W, Re, Os, Ir or Pt.

The present invention is especially useful for converting s-HIN to its isomer, as-HIN, or as-HIN to its isomer, s-HIN, by a process comprising contacting a feed rich in one of the said isomers with an acidic alumino-silicate catalyst in the presence of 5–1500 p.s.i. of hydrogen at a temperature above 40° C. but below cracking temperature, whereby isomerization of the contacted isomer to the other isomer occurs. From 1 to 20 (preferably, from 2–12) percent of water, based on the weight of the catalyst, can also be present in the contact zone (some as in the form of hydroxyl groups). Means of recovering said other isomer from the isomerization mixture are disclosed for example, in the aforementioned application Ser. No. 869,868, filed Oct. 27, 1969. The resulting depleted isomerization mixture can be recycled and further contacted with the catalyst.

The preferred acidic alumino-silicate catalyst comprises a crystalline zeolite (and, more preferably, is at least 50% crystalline). Also preferred is an acidic alumino-silicate catalyst, wherein the atomic ratio Al/Si is from 0.65 to 0.2 and wherein (on analysis prior to said contacting) there is at least one trivalent or divalent metal, metal oxide or metal hydroxide cation for every twelve atoms of aluminum in said alumino-silicate. Also preferred as such metals of the cation are the rare earths, especially Y, La and Gd.

In the conversion of s-OHP to s-OHA (or of s-OHA to s-OHP), one preferred catalyst is the Gd alumino-silicate described in the aforementiond U.S. patent applications, Ser. No. 715,994, Ser. No. 715,998 and Ser. No. 718,980. For this conversion, the preferred conditions are a temperature above 5° C. (more preferably in the range of 80–120° C.) at a weight hourly space velocity of 0.1–20 (more preferably 0.25–10), and in the presence of 5–500 (more preferably 15–250) p.s.i. of hydrogen. The hydrogen partial pressure in the conversion zone is preferably from 15 to 100% of the total gas pressure. The process can be conducted when the hydrocarbonaceous feed is contacted in liquid, vapor or mixed phase (e.g., at reflux or in trickle phase). The hydrogen can be recycled (as at rates up to 10,000 s.c.f./bbl. of feed). If the catalyst activity appreciably decreases in time, the catalyst can be separated from the hydrocarbon reactants and regenerated, as by burning in air. After such burning, water can be added by the means disclosed in the previously cited copending applications.

ILLUSTRATIVE EXAMPLES

The following examples illustrate the preparation of an acidic Gd alumino-silicate catalyst (GdHY) which can be used in the subect process and illustrate the use of the GdHY catalyst in the subject process to isomerize s-OHA to s-OHP, to isomerize s-OHP to s-OHA, and to isomerize s-HIN to as-HIN or the reverse.

EXAMPLE I

An $NH_4Y$ zeolite was prepared by contacting 625 g. NaY zeolite (sorptometer surface area of 758 m.$^2$/g.) for 12 exchange cycles with fresh portions of a boiling (105° C.) solution of 535 g. $NH_4Cl$ in 1425 mls. distilled water at 100° C. (i.e., a 5.5 normal solution). The fresh solution had a pH at 100° C. of 4.2–4.5 (which, when necessary, was obtained by adjusting with either $NH_4OH$ or HCl). Prior to contact the solution was filtered to insure that it is free of undissolved salt particles. The equilibrated NaY zeolite (in ambient air for 24 hours) had a 25.7% weight loss on ignition and analyzed 10.16% Na, 45.99% $SiO_2$ and 16.60% $Al_2O_3$. On a water-free basis the NaY contained 0.442 mole Na+ per 100 g. zeolite. Each ammonium exchange cycle was for a ½ hour contact period followed by adjusting the pH to 5.5 with $NH_4OH$ and then filtering the hot (80–90° C.) slurry (filtrate pH range from 4.5 to 5.2). After the 12 $NH_4Cl$ exchange cycles, the zeolite was washed for 8 cycles of 15 minutes contact, and then filtered, with 1.4 liters each of distilled $H_2O$. After this washing a test with silver nitrate showed that the filtrate contained no Cl—.

The washed zeolite cake was broken up and dried overnight at 140° C. On the next day, the dry zeolite was pulverized and screened through a 100-mesh screen. The resulting $NH_4Y$ zeolite (after equilibration in ambient air for 24 hours) had a weight loss on ignition at 1000° C. (for two hours) of 29.9%, and analyzed 4.70 wt. percent N (0.426 mole $NH_4^+$/100 g. of waterfree $NH_4Y$ zeolite). It contained less than 0.1 wt. percent Na (or less than 0.006 mole Na/100 g. of water-free zeolite).

47.7 g. of this $NH_4Y$ zeolite was then exchanged for 16 cycles each with 239 mls. of a pH 4.3 solution of 67 g. $Gd(NO_3)_3 \cdot 5H_2$ (99.9% pure) in 3.82 liters distilled water. The 4.3 pH was obtained by adjusting the pH 2.4 Gd-nitrate solution with $NH_4OH$. At the beginning of each contact period the zeolite slurry was adjusted to pH 5.0. The filtrate pH ranged from 4.6 to 5.2. After the 16 Gd-nitrate exchange cycles, the resulting $GdNH_4Y$ zeolite was washed for 8 cycles each, of 15 minutes contact, with ½ liter distilled $H_2O$ (a diphenyl amine test showed that no nitrate ion was present in the filtrate from the 8th wash cycle). The $GdNH_4Y$ was dried overnight at 140° C. and then put through a 100-mesh screen.

The resulting 100-mesh $GdNH_4Y$ zeolite (after equilibration in ambient air) had a 24.1% weight loss on ignition (for 2 hours at 1000° C.). The $GdNH_4Y$ zeolite contained 0.46 wt. percent N (0.043 mole $NH_4^+$/100 g. water-free $GdNH_4Y$), 14.05 wt. percent Gd (0.116 mole Gd/100 g.) and less than 0.1% Na (less than 0.006 mole Na/100 g.).

The 100-mesh $GdNH_4Y$ was activated by heating slowly in flowing dry air in a split tube furnace to 500° C., held at 500° C. for 4 hours and bottled hot.

The activated GdHY zeolite had a sorptometer surface area of 757 m.$^2$/g.

EXAMPLE II 10 ml. portions of feed hydrocarbon (s-OHA or s-OHP) and 4.5 g. portions of the activated GdHY catalyst of Example I, were placed in a magnetically stirred Parr bomb into which hydrogen was introduced until the pressure was 110 p.s.i.g. The bomb was then heated to 100° C. and that temperature was maintained for a desired period of time, after which the bomb was cooled to room temperature, the pressure was reduced and a sample of the catalyst-free reaction product was taken for chromatographic analysis.

The results of a series of such runs (designed as Runs A, B, D and E) and of blank runs (Runs C and H) made with no hydrogen gas present in the bomb is summarized in the following Tables 1 and 2. In Table 1, the feed hydrocarbon was s-OHA. In Table 2, the feed hydrocarbon was s-OHP. Runs F and G in Table 2 are runs which are reported in the previously cited application Ser. No. 590,-225, now U.S. Pat. No. 3,396,203, using a mixed rare earth hydrogen Y zeolite and no hydrogen pressure.

s-OHA can be separated (as by crystallization) from the reaction mixture and dehydrogenated to produce anthracene.

The subject process can also be used to convert prehnitene to durene or to convert durene to prehnitene. Similarly, pseudocumene can be converted to mesitylene. Alkyltetralins can be converted to isomeric alkyltetralins.

EXAMPLE III

Example II is repeated except that the feed hydrocarbon is s-hydrindacene and the average temperature in the bomb is maintained at about 150° C. The major reaction product is as-hydrindacene. The reverse reaction can also be effected at 150° C. when the feed hydrocarbon consists essentially of as-hydrindacene. These reaction products, per se, as useful as heat exchange fluids, as in a nuclear reactor, or they can be hydrogenated (to at least 95% saturation) to produce a naphthene mixture which is useful as a traction fluid component (e.g., 10 volume percent of the hydrogenated mixture can be blended with 90 volume percent of hydrogenated polybutylene oil having a viscosity of 10 c.s. at 210° F. and a bromine number of less than 5).

The conversion of the present example is illustrated by the following equilibrium:

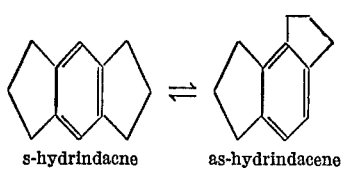

s-hydrindacne        as-hydrindacene

Other conversions which can be made, in a similar manner, (e.g. a temperature of at least 40° C. and below cracking temperature, preferably 100–250° C.) are illustrated by the following:

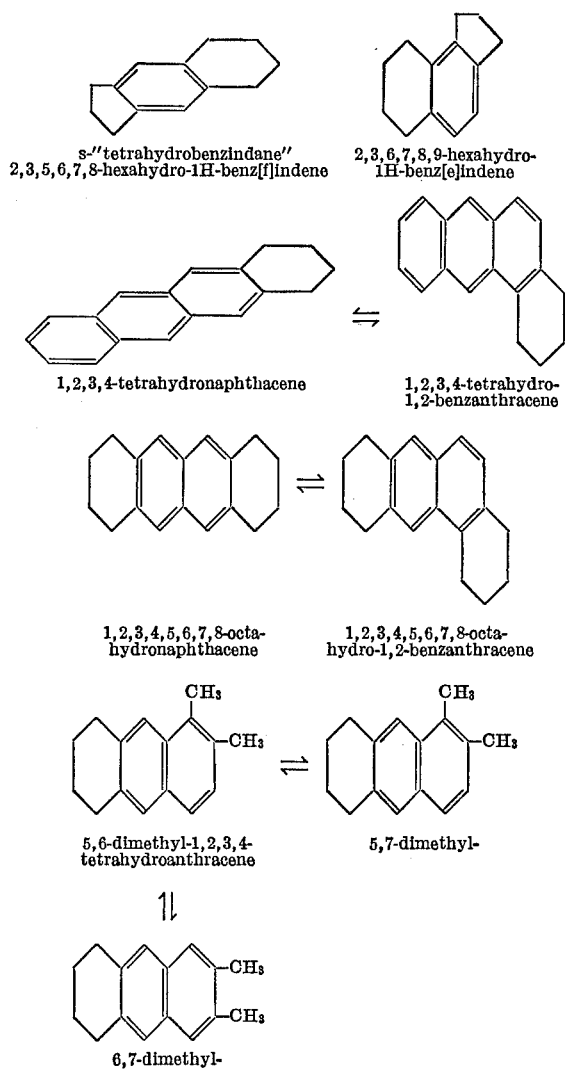

TABLE 1.—CONVERSION OF s-OHA TO s-OHP AT 100° C.

| Run | Type catalyst | Reaction time, hrs. | $H_2$ p.s.i.g. | Percent conversion | Product distribution (wt. percent) | | |
|---|---|---|---|---|---|---|---|
| | | | | | OHA | OHP | Other |
| A | GdHY | 1.5 | 110 | 41.2 | 58.8 | 41.2 | |
| B | GdHY | 5 | 110 | 41.0 | 59.0 | 41.0 | |
| C | GdHY | 1.5 | None | 44.4 | 55.6 | 44.4 | |

TABLE 2.—CONVERSION OF s-OHP TO s-OHA AT 100° C.

| Run | Type catalyst | Reaction time, hrs. | $H_2$ p.s.i.g. | Percent conversion | Product distribution (wt. percent) | | |
|---|---|---|---|---|---|---|---|
| | | | | | OHA | OHP | Other |
| D | GdHY | 1.5 | 110 | 56.3 | 54.2 | 43.7 | 2.1 |
| E | GdHY | 5 | 110 | 57.2 | 54.5 | 42.8 | 2.7 |
| F | REHY | 1 | None | 12.2 | 10.2 | 87.8 | 2.0 |
| G | REHY | 5 | None | 25.4 | 20.8 | 74.6 | 4.5 |
| H | GdHY | 1.5 | None | 14.3 | 12.2 | 85.7 | 2.1 |

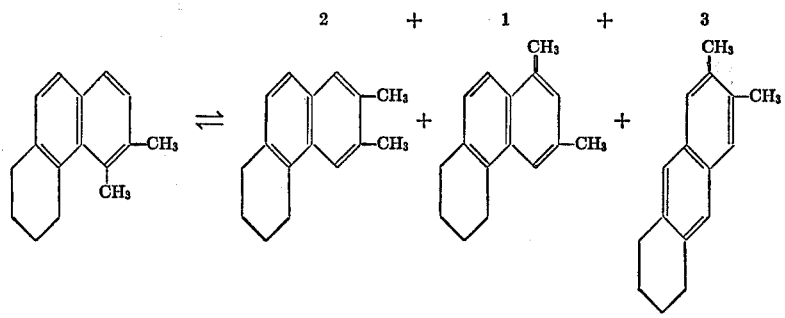

The invention claimed is:

1. Process for converting a polycyclic aromatic hydrocarbon to an isomer, or the conversion of said isomer to said polycyclic aromatic hydrocarbon, said process comprising contacting a feed rich in said polycyclic aromatic hydrocarbon, or rich in the said isomer with an acetic alumino-silicate catalyst containing rare earth cations in the presence of from 5–1500 p.s.i. of hydrogen at a temperature above 40° C. but below cracking temperature, whereby isomerization of the contacted hydrocarbon to the other isomer occurs.

2. Process according to claim 1 wherein said polycyclic aromatic hydrocarbon or said other isomer contains at least three condensed rings.

3. Process according to claim 2 wherein said polycyclic aromatic hydrocarbon or said isomer is recovered from the reaction mixture and after recovery the resulting depleted isomerization mixture is recycled and further contacted with said catalyst.

4. Process according to claim 1 wherein said acidic alumino-silicate catalyst comprises a crystalline zeolite.

5. Process according to claim 4 wherein said contacting is effected in the presence of from 2 to 12 percent of water, based on the weight of said catalyst.

6. Process according to claim 1 wherein said catalyst has an Al/Si atomic ratio of from 0.65 to 0.2 and contains at least 1 trivalent or divalent metal, metal oxide or metal hydroxide cation for every 12 atoms of aluminum in said alumino-silicate.

7. Process according to claim 6 wherein said cation comprises at least one rare earth selected from Y, La and Gd.

8. Process according to claim 7 wherein s-hydrindacene is converted to as-hydrindacene by contact with an acidic Gd alumino-silicate catalyst in the presence of from 15–250 p.s.i. of hydrogen.